United States Patent [19]
Vinciguerra et al.

[11] Patent Number: 5,376,918
[45] Date of Patent: Dec. 27, 1994

[54] MOTOR VEHICLE ANTICIPATED BRAKING WARNING DEVICE

[76] Inventors: Stephen Vinciguerra, 30 Utica Ave., P.O. Box 609, Latham, N.Y. 12110; Edward F. Durivage, 1817 Wiswall Ave., Watervliet, N.Y. 12189

[21] Appl. No.: 134,107

[22] Filed: Oct. 8, 1993

Related U.S. Application Data

[63] Continuation-in-part of Ser. No. 920,668, Jul. 28, 1992, abandoned.

[51] Int. Cl.⁵ .............................................. G01C 21/00
[52] U.S. Cl. ........................................ 340/479; 340/467
[58] Field of Search .................... 340/479, 464, 467; 307/10.8

[56] References Cited

U.S. PATENT DOCUMENTS

| | | | |
|---|---|---|---|
| 2,784,348 | 3/1957 | Danek | 315/80 |
| 2,982,944 | 5/1961 | Weller | |
| 3,320,586 | 5/1967 | Wagner | |
| 3,336,450 | 8/1967 | Rainer | 200/61.89 |
| 3,375,496 | 3/1968 | Antunovic | |
| 3,395,388 | 7/1968 | Hendrickson | |
| 3,414,879 | 12/1968 | Holland | |
| 3,576,529 | 4/1971 | Garrison | |
| 3,806,870 | 4/1974 | Kalajian | |
| 3,911,394 | 10/1975 | Shames | |
| 3,921,750 | 11/1975 | Shames | 180/103 |
| 4,034,338 | 7/1977 | Bevilacqua | |
| 4,107,647 | 8/1978 | Yoshino | 340/669 |
| 4,149,141 | 4/1979 | Tanimura | |
| 4,663,609 | 5/1987 | Rosario | 340/479 |
| 4,757,301 | 7/1988 | Neale, Jr. | 340/479 |
| 4,808,968 | 2/1989 | Caine | 340/479 |
| 4,812,807 | 3/1989 | Davis et al. | 340/467 |
| 4,823,109 | 4/1989 | Boyer | 340/467 |
| 4,843,368 | 6/1989 | Poulos | 340/464 |
| 4,894,640 | 1/1990 | Beasley et al. | 340/464 |
| 4,916,431 | 4/1990 | Gearey | 340/479 |
| 4,918,424 | 4/1990 | Sykora | 340/464 |
| 4,922,225 | 5/1990 | Dankert | 340/467 |
| 4,924,207 | 5/1990 | Lariscy | 340/467 |
| 4,952,909 | 8/1990 | Woerner et al. | 340/464 |
| 4,959,634 | 9/1990 | Miller | 340/467 |
| 4,987,405 | 1/1991 | Jakobowski | 340/479 |
| 4,990,887 | 2/1991 | Lee | 340/479 |
| 5,172,095 | 12/1992 | Scott | 340/479 |

*Primary Examiner*—Brent Swarthout
*Attorney, Agent, or Firm*—Heslin & Rothenberg

[57] ABSTRACT

An amber warning light at the rear of a motor vehicle warns a following driver of the potential braking of the lead vehicle. Upon release of the accelerator, a first variable timer acts as a delay to allow for typical events, such as reacceleration, speed control initiation, manually changing gears or for braking. At the end of the first timer cycle, if one of the events has not occurred, the amber warning light is illuminated for a time period defined by a second variable timer. If one of the events takes place during the first timer cycle, the amber warning light is prevented from becoming illuminated. If one of the events takes place during the second timing cycle, the warning light is extinguished.

19 Claims, 2 Drawing Sheets

MOTOR VEHICLE ANTICIPATED BRAKING WARNING DEVICE

RELATED APPLICATION

This application is a continuation-in-part of application Ser. No. 07/920,668, filed Jul. 28, 1992, now abandoned.

BACKGROUND OF THE INVENTION

1. Technical Field

The present invention generally relates to vehicle movement indication devices. More particularly, the present invention relates to rear-end motor vehicle motion warning devices.

2. Background Art

Motor vehicle braking indication devices have existed for some time now. The traditional implementation is one or more red brake lights at the rear of a motor vehicle that are illuminated during the activation of the braking system. The traditional stop lights do indeed help prevent rear-end collisions, due to the time provided to the following driver for realizing the stoppage of the lead vehicle and acting on that realization.

However, even more rear-end collisions may be prevented if still more time were given to the following driver for acting on the warning, i.e., to stop his or her vehicle. There have been several attempts to provide improved warning of situations in which the brakes of the vehicle ahead are not necessarily activated, but the vehicle is nonetheless slowing or not accelerating.

As an example, U.S. Pat. No. 4,990,887 issued to Lee discloses a vehicle brake light system where the existing brake lights stay on for a predetermined time after release of the brake pedal. The Lee brake light extender addresses the problem of the driver of the second vehicle not realizing the first vehicle is in the process of accelerating and not currently traveling at cruising speed.

As another example, U.S. Pat. No. 4,812,807 issued to Davis et al. discloses a vehicle motion indicator where a light of a different color from the brake lights is illuminated whenever a condition exists where neither the accelerator nor the brake are being depressed. The Davis light addresses the problem of indicating to the second driver that the first driver is coasting.

As still a further example, U.S. Pat. No. 4,823,109 issued to Boyer discloses a warning light system for vehicles having an engine brake where a light of a different color from the brake lights is activated after a time delay by a release of the accelerator, which engages the engine brake. The Boyer warning light addresses the problem of trucks slowing or stopping via use of the engine brake without warning the following driver, while still allowing for the routine shifting of gears with the time delay.

Although each of the references above address important problems, they do not directly address the problem of the following vehicle driver not having enough time to act on the warning provided by the lead vehicle. In addition, the art contains vehicle motion indication devices that seek to provide too much information to the following driver and result in what is known as the "christmas tree effect", i.e., too many lights on the lead vehicle causing confusion of the driver of the following vehicle.

Thus, a need exists for a vehicle motion indication device that increases the time available for response by the driver of the following vehicle, while avoiding the "christmas tree effect".

SUMMARY OF THE INVENTION

Briefly, the present invention satisfies the need to increase available driver response time without being confusing by providing an anticipated braking warning device that warns the driver of the following vehicle of potential slowing or stopping of the lead vehicle.

A vehicle anticipated braking warning device (hereinafter "VABW") is provided for a vehicle having a propulsion system, a braking system, a brake light of a first color coupled to the braking system and an accelerator for regulating the propulsion system. The braking system is operable between at least one active state in which vehicle speed is reduced and an inactive state in which the vehicle speed is unaffected. The accelerator is operable between an inactive state in which substantially no propulsion is provided by the propulsion system and at least one active state in which propulsion is provided. An anticipated braking warning light (ABWL) of a second color is provided. Means are also provided for illuminating the ABWL after a first predetermined time period for a second predetermined time period in response to operation of the accelerator from the at least one active state to the inactive state. Means responsive to operation of the braking system from the inactive state to an active state is provided for terminating the illuminating means. Means responsive to an event other than operation of the braking system from the inactive state to the at least one active state is also provided for terminating the illuminating means.

In one aspect of the invention, the termination event is the operation of the accelerator from the inactive state back to the at least one active state. In another aspect of the invention, the vehicle further includes a manual clutch operable between an active state in which the propulsion system is disengaged and an inactive state in which the propulsion system is engaged. In this aspect, the termination event is the operation of the clutch from the inactive state to the active state. In still another aspect of the invention, the vehicle further includes a speed control device operable between at least one active state in which the speed of the vehicle is controlled and at least one inactive state in which no control is exerted over the speed of the vehicle. In this aspect, the termination event is the operation of the speed control device from the at least one inactive state to the at least one active state.

These, and other objects, features and advantages of this invention will become apparent from the following detailed description of the various aspects of the invention taken in conjunction with the accompanying drawings.

BEST MODE FOR CARRYING OUT THE INVENTION

Figure 1:
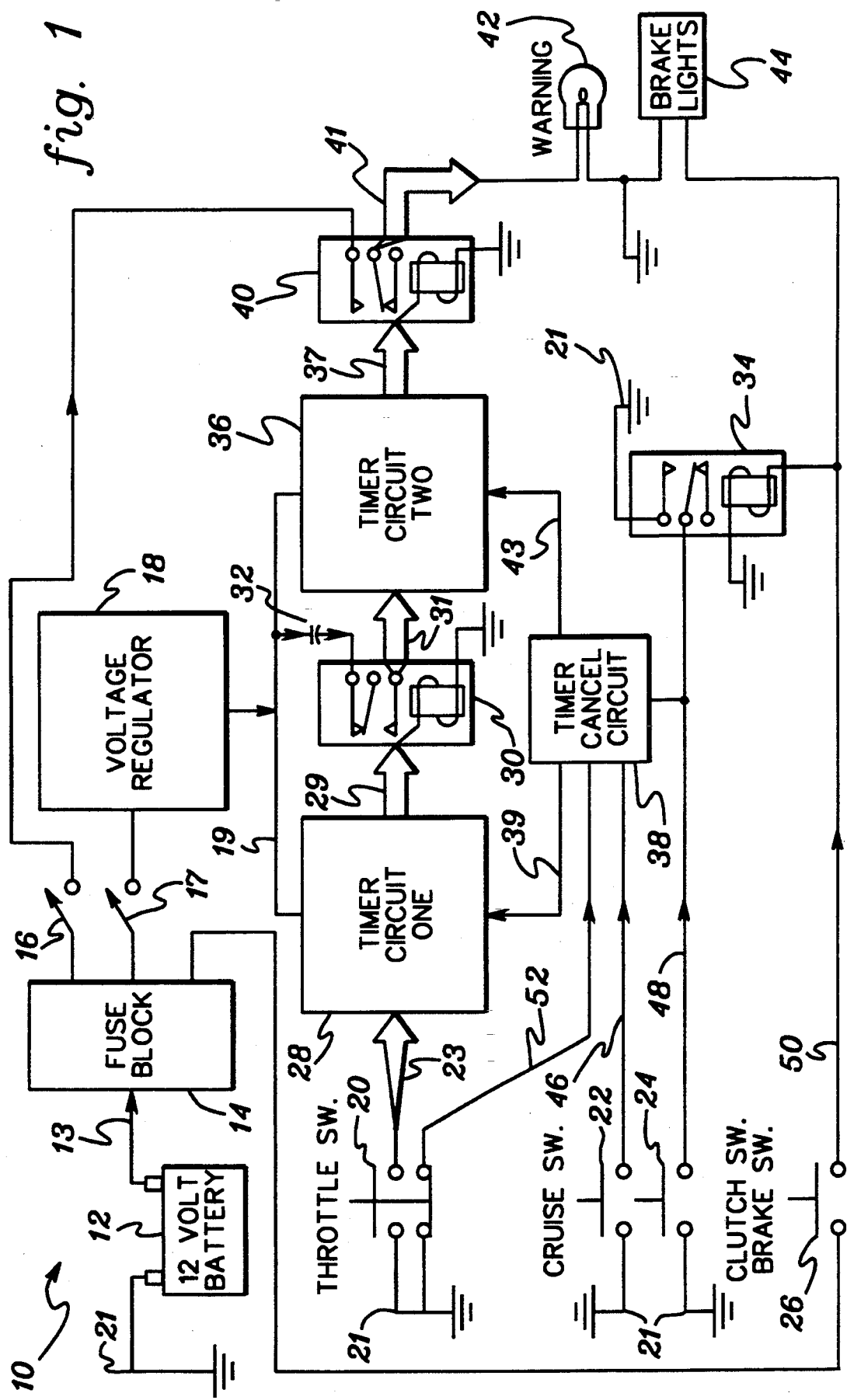
FIG. 1 is a block diagram representation of a vehicle anticipated braking warning device (VABW) according to the present invention.

FIG. 1 is a block diagram representation of a vehicle anticipated braking warning device (VABW) 10 according to the present invention. Included therein is battery 12, fuse block 14, accessory switches 16 and 17, voltage regulator 18, two-pole accelerator switch 20, single pole speed control switch 22, single pole clutch switch 24, single pole brake switch 26, first timer circuit 28, relay 30, capacitor 32, relay 34, second timer circuit 36, timer cancel circuit 38, relay 40, anticipated braking warning light (ABWL) 42 and brake lights 44.

Figure 2:
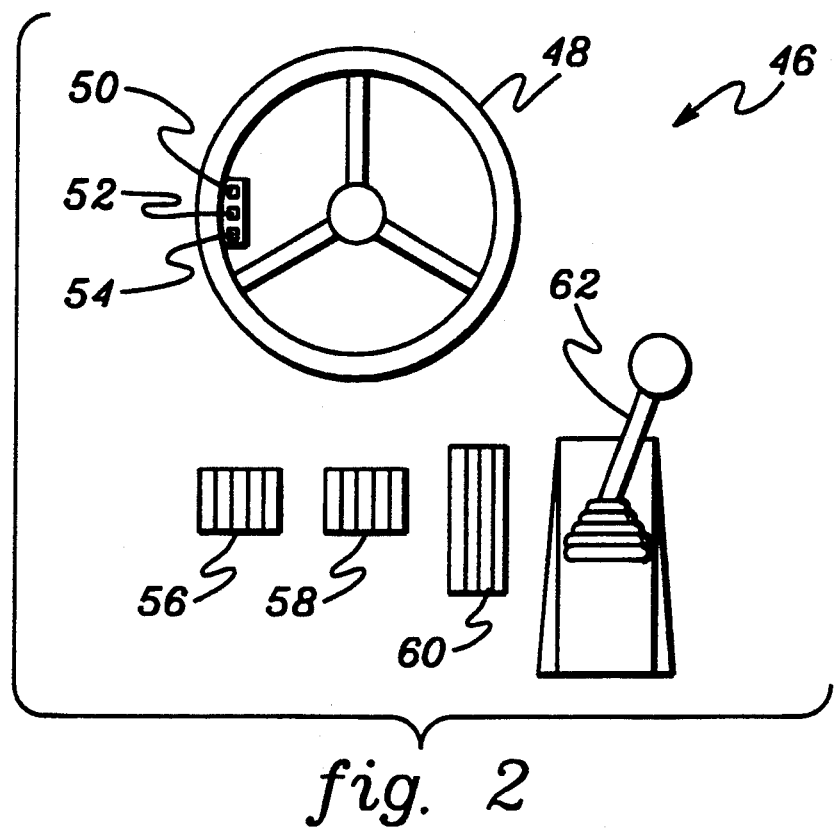
FIG. 2 depicts the interior of a motor vehicle equipped with the VABW of FIG. 1.

FIG. 2 depicts the interior 46 of a motor vehicle equipped with the VABW 10 of FIG. 1. Included therein is steering wheel 48, speed control set/coast switch 50, speed control cancel switch 52, speed control resume/accelerate switch 54, clutch pedal 56, brake pedal 58, accelerator pedal 60 and stick shift 62. The components listed above operate as in conventional motor vehicles.

The operation of VABW 10 will now be described with reference to FIGS. 1 and 2. Current leaves battery 12 over line 13 travelling to fuse block 14 where it is split up and fused. Accessory switch 16 controls power to relay 40, while accessory switch 17 controls power to voltage regulator 18. Voltage regulator 18 is used to regulate power to VABW 10, since modern alternators may produce as much as twenty volts at times, even though modern automobile batteries are twelve volts. Such voltage peaks could destroy integrated circuits, such as timer circuit 28.

When the driver of the vehicle presses accelerator pedal 60, accelerator switch 20 is forced to close, thus connecting the first timer circuit 28 with vehicle ground 21 over line 23. Upon release of accelerator pedal 60, switch 20 opens and removes the negative signal (i.e., ground) from timer circuit 28. The removal of the negative signal completes the negative pulse which triggers timer circuit 28.

While timer circuit 28 is engaged, it sends a positive twelve volt signal received from voltage regulator 18 over line 19 to relay 30 over line 29, which causes relay 30 to close. Timer circuit 28 serves as a delay to enable the driver to, for example, change gears, reaccelerate, initiate speed control or brake. Thus, timer circuit 28 should provide a sufficient time for such activities, for example, a few seconds. While relay 30 is closed, capacitor 32 charges. When the timing cycle of timer circuit 28 ends, relay 30 opens and capacitor 32 provides a negative pulse for triggering timer circuit 36 over line 31. During the timing cycle of timer circuit 36, a sufficient voltage is supplied to close relay 40 over line 37, providing a path for an unregulated twelve volt signal to arrive at ABWL 42 over line 41 for illumination thereof. Preferably, the timing cycle for each of timer circuit 28 and timer circuit 36 is adjustable.

ABWL 42 remains illuminated for the duration of the timing cycle of timer circuit 36, unless an event requiring non-illumination of ABWL 42 takes place, such as the vehicle's speed control is activated, clutch pedal 56 is depressed, brake pedal 58 is depressed or accelerator pedal 60 is depressed after the triggering release. If such an event takes place during the timing cycle of either timing circuit 28 or timing circuit 36, a signal is sent to timer cancel circuit 38, which then simultaneously sends an ABWL cancel signal over lines 39 and 43 to timer circuits 28 and 36, respectively. The ABWL cancel signal cancels the timers, preventing ABWL 42 from illuminating if sent during the timing cycle of timer circuit 28 and extinguishing ABWL 42 prematurely if sent during the timing cycle of timer circuit 36.

Depressing set/coast button 50 quickly or resume/accelerate button 54 causes vacuum to be attempted, as is known in the art. Once vacuum is achieved, vacuum switch 22 connects timer cancel circuit 38 with vehicle ground 21, providing a negative signal for the triggering thereof. If set/coast button 50 is depressed for more than a brief period or cancel button 52 is depressed, vacuum is disengaged, switch 22 opens and timer cancel circuit 38 is deactivated.

Upon depressing clutch pedal 56, clutch switch 24 closes, connecting timer cancel circuit 38 with vehicle ground 21, providing a negative signal for the triggering thereof. Timer cancel circuit 38 cancels timer circuits 28 and 36 in accordance with the previous description.

In response to the depression of brake pedal 58, brake switch 26 closes, providing an unregulated twelve volt signal to relay 34 and brake lights 44. Relay 34 closes in response to the twelve volt signal, providing a negative signal to timer cancel circuit 38. Again, timer cancel circuit 38 operates as previously described.

If accelerator pedal 60 is depressed again after the initial release, double pole switch 20 connects timer cancel circuit 38 with vehicle ground 21, again leading to cancellation of timer circuits 28 and 36.

Figure 3:
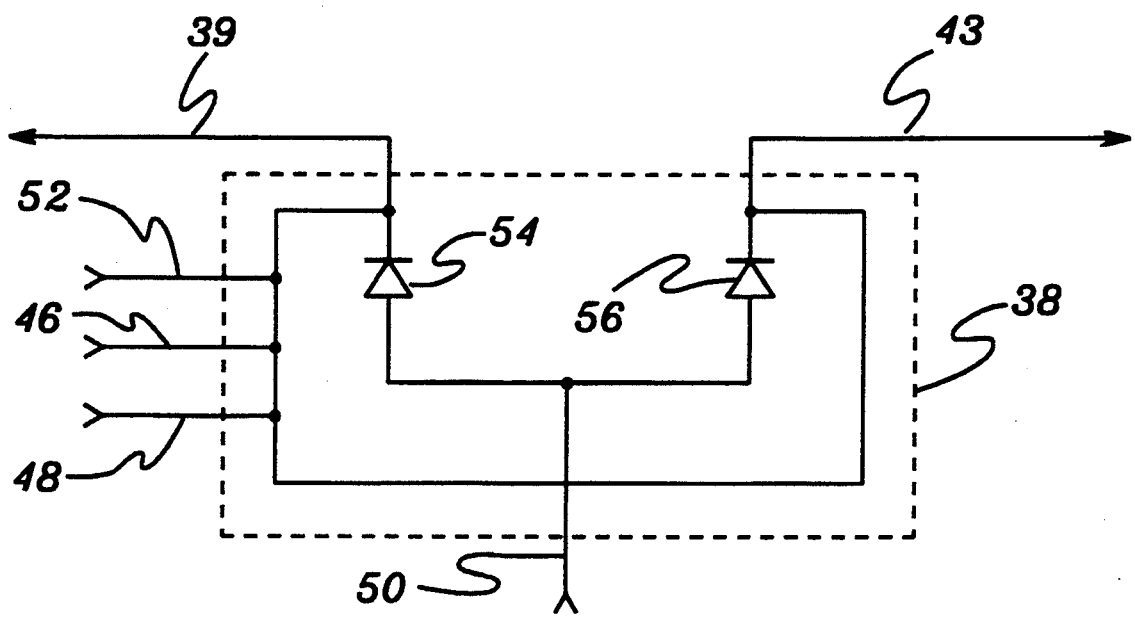
FIG. 3 is a more detailed block diagram representation of a portion of the VABW of FIG. 1.

FIG. 3 provides detail regarding timer cancel circuit 38. The signal from relay 34 travels to both diode 54 and diode 56 over line 50, which provide the ABWL cancel signal to timer circuit 28 over line 39 and timer circuit 36 over line 43. When cruise switch 22, clutch switch 24 or accelerator switch 52 close, the negative signal bypasses diodes 54 and 56 directly to lines 39 and 43.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

We claim:

1. A vehicle anticipated braking warning device (VABW), said vehicle including a propulsion system, a braking system operable between at least one active state in which vehicle speed is reduced and an inactive state in which said vehicle speed is unaffected, a brake light coupled to said braking system having a first color and an accelerator for regulating said propulsion system, said accelerator being operable between an inactive state in which substantially no propulsion is provided by said propulsion system and at least one active state in which propulsion is provided, said VABW comprising:

an anticipated braking warning light (ABWL) having a second color;

means for illuminating said ABWL after a first predetermined time period for a second predetermined time period in response to operation of said accelerator from said at least one active state to said inactive state wherein said illuminating means comprises an accelerator sensor for emitting a first electrical signal in response to operation of said accelerator from said at least one active state to said inactive state, a first timing circuit responsive to said first electrical signal for emitting a second electrical signal, said first timing circuit having a first timing cycle and emitting said second electrical signal throughout said first timing cycle, means responsive to said second electrical signal for activating a second timing circuit upon termination of said second electrical signal, said second timing circuit having a second timing cycle and emitting a third electrical signal throughout said second timing cycle, and means responsive to said third electrical signal for illuminating said ABWL throughout said second timing cycle;

means for terminating said illuminating means in response to operation of said braking system from said inactive state to said at least one active state; and means for terminating said illuminating means in response to an event other than operation of said braking system from said inactive state to said at least one active state.

2. The VABW of claim 1, wherein said first timing circuit has a variable timing cycle.

3. The VABW of claim 1, wherein said second timing circuit has a variable timing cycle.

4. The VABW of claim 1, wherein said accelerator sensor comprises an electrical switch.

5. The VABW of claim 1, wherein said brake light comprises a red light and wherein said ABWL comprises an amber light.

6. The VABW of claim 1, wherein said means for terminating responsive to said braking system comprises:

a braking sensor for emitting a first electrical signal in response to operation of said braking system from said inactive state to at least one active state; and means responsive to said first electrical signal for terminating said illuminating means.

7. The VABW of claim 6, wherein said terminating means responsive to said first electrical signal comprises:

a relay that closes to provide a second electrical signal in response to said first electrical signal and opens in response to an absence of said first electrical signal; and an ABWL cancel circuit responsive to said second electrical signal for emitting an ABWL cancel signal.

8. The VABW of claim 1, wherein said terminating means responsive to said event comprises:

an event sensor for emitting a first electrical signal in response to said event; and means responsive to said first electrical signal for terminating said illuminating means.

9. The VABW of claim 8 wherein said event sensor comprises an electrical switch.

10. The VABW of claim 8 wherein said event sensor comprises a reacceleration sensor for emitting said first electrical signal in response to operation of said accelerator from said inactive state to at least one active state.

11. The VABW of claim 10 wherein said terminating means responsive to said first electrical signal comprises an ABWL cancel circuit responsive to said first electrical signal for emitting an ABWL cancel signal.

12. The VABW of claim 10, wherein said means for terminating responsive to said braking system comprises:

a braking sensor for emitting a second electrical signal in response to operation of said braking system from said inactive state to said at least one active state; and means responsive to said second electrical signal for terminating said illuminating means.

13. The VABW of claim 8, wherein said vehicle further includes a manually operated clutch operable between at least one active state in which said propulsion system is disengaged and at least one inactive state in which said propulsion system is engaged, and wherein said event sensor comprises a clutch sensor for emitting said first electrical signal in response to operation of said clutch from said at least one inactive state to said at least one active state.

14. The VABW of claim 13, wherein said terminating means responsive to said first electrical signal comprises an ABWL cancel circuit responsive to said first electrical signal for emitting an ABWL cancel signal.

15. The VABW of claim 8, wherein said vehicle further includes a manually operated clutch operable between at least one active state in which said propulsion system is disengaged and at least one inactive state in which said propulsion system is engaged, and wherein:

said terminating means responsive to said braking system comprises a braking sensor for emitting a second electrical signal in response to operation of said braking system from said inactive state to said at least one active state, and means responsive to said second electrical signal for terminating said illuminating means; and said event sensor comprises a clutch sensor for emitting said first electrical signal in response to operation of said manually operated clutch from said at least one inactive state to said at least one active state.

16. The VABW of claim 8, wherein said terminating means responsive to said braking system comprises:

a braking sensor for emitting a second electrical signal in response to operation of said braking system from said inactive state to said at least one active state; and means responsive to said second electrical signal for terminating said illuminating means.

17. A vehicle anticipated braking warning device (VABW), said vehicle including a propulsion system, a braking system operable between at least one active state in which vehicle speed is reduced and an inactive state in which said vehicle speed is unaffected, a brake light coupled to said braking system having a first color, a speed control device operable between at least one active state in which the speed of said vehicle is controlled and at least one inactive state in which no control is exerted over the speed of said vehicle and an accelerator for regulating said propulsion system, said accelerator being operable between an inactive state in which substantially no propulsion is provided by said propulsion system and at least one active state in which propulsion is provided, said VABW comprising:

an anticipated braking warning light (ABWL) having a second color;

means for illuminating said ABWL after a first predetermined time period for a second predetermined time period in response to operation of said accelerator from said at least one active state to said inactive state;

means for terminating said illuminating means in response to operation of said braking system from said inactive state to said at least one active state, comprising:
- a braking sensor for emitting a second electrical signal in response to operation of said braking system from said inactive state to said at least one active state, and
- means responsive to said second electrical signal for terminating said illuminating means; and means for terminating said illuminating means in response to an event other than operation of said braking system from said inactive state to said at least one active state, wherein said terminating means responsive to said event comprises:
- an event sensor for emitting a first electrical signal in response to said event, wherein said event sensor comprises a speed control sensor for emitting said first electrical signal in response to operation of said speed control device from said at least one inactive state to said at least one active state, and
- means responsive to said first electrical signal for terminating said illuminating means.

18. A vehicle anticipated braking warning device (VABW), said vehicle including a propulsion system, a braking system operable between at least one active state in which vehicle speed is reduced and an inactive state in which said vehicle speed is unaffected, a brake light coupled to said braking system having a first color, a speed control device operable between at least one active state in which the speed of said vehicle is controlled and at least one inactive state in which no control is exerted over the speed of said vehicle and an accelerator for regulating said propulsion system, said accelerator being operable between an inactive state in which substantially no propulsion is provided by said propulsion system and at least one active state in which propulsion is provided, said VABW comprising:

an anticipated braking warning light (ABWL) having a second color;

means for illuminating said ABWL after a first predetermined time period for a second predetermined time period in response to operation of said accelerator from said at least one active state to said inactive state;

means for terminating said illuminating means in response to operation of said braking system from said inactive state to said at least one active state; and means for terminating said illuminating means in response to an event other than operation of said braking system from said inactive state to said at least one active state, wherein said terminating means responsive to said event comprises:
- an event sensor for emitting a first electrical signal in response to said event, comprising a speed control sensor for emitting said first electrical signal in response to operation of said speed control device from said at least one inactive state to said at least one active state, and
- means responsive to said first electrical signal for terminating said illuminating means.

19. The VABW of claim 18, wherein said terminating means responsive to said first electrical signal comprises an ABWL cancel circuit responsive to said first electrical signal for emitting an ABWL cancel signal.

* * * * *